(12) United States Patent
Hagglund (10) Patent No.: US 9,383,246 B2
(45) Date of Patent: Jul. 5, 2016

(54) SECTIONED PROBE FOR A RADAR LEVEL GAUGE

(71) Applicant: Rosemount Tank Radar AB, Gothenburg (SE)

(72) Inventor: Bengt Hagglund, Kungalv (SE)

(73) Assignee: ROSEMOUNT TANK RADAR AB, Gothenburg (SE)

(*) Notice: Subject to any disclaimer, the term of this patent is extended or adjusted under 35 U.S.C. 154(b) by 363 days.

(21) Appl. No.: 14/019,854

(22) Filed: Sep. 6, 2013

(65) Prior Publication Data
US 2015/0070206 A1    Mar. 12, 2015

(51) Int. Cl.
*G01S 13/08* (2006.01)
*G01F 23/284* (2006.01)
*H01P 1/04* (2006.01)
*H01P 1/22* (2006.01)
*H01Q 1/50* (2006.01)
*F16L 15/08* (2006.01)

(52) U.S. Cl.
CPC ............. *G01F 23/284* (2013.01); *H01P 1/042* (2013.01); *H01P 1/225* (2013.01); *H01Q 1/50* (2013.01); *F16L 15/08* (2013.01)

(58) Field of Classification Search
CPC ......... G01F 23/284; H01Q 1/225; H01Q 1/50
USPC ........................................................ 342/124
See application file for complete search history.

(56) References Cited

U.S. PATENT DOCUMENTS

| 4,067,404 A | * | 1/1978 | Crase ...................... F16L 11/18 175/75 |
| 4,519,638 A | * | 5/1985 | Yodoshi .................. F16L 25/08 285/305 |

(Continued)

FOREIGN PATENT DOCUMENTS

| AU | 579 370 | 11/1988 |
| EP | 1 434 039 | 6/2004 |

(Continued)

OTHER PUBLICATIONS

Notification of Transmittal of the International Search Report and the Written Opinion of the International Searching Authority, from PCT/EP2014/068879, Jan. 9, 2015.

*Primary Examiner* — John B Sotomayor
*Assistant Examiner* — Marcus Windrich
(74) *Attorney, Agent, or Firm* — Westman, Champlin & Koehler, P.A.

(57) ABSTRACT

The present invention relates to a guided wave radar level gauge comprising a transceiver, processing circuitry and a single conductor probe comprising at least two elongate probe sections. A connector extending from a first end of the probe section comprises: an abutment portion having a diameter smaller than a diameter of the probe section, an intermediate portion, having a diameter smaller than the abutment portion, arranged between the probe section and the abutment portion and an outside threaded portion. A second end portion of the probe section comprises a sleeve comprising an inside threaded receiving portion receiving the connector; a passage through a sidewall of the sleeve being located off-center in relation to a longitudinal central axis of the probe section. The probe further comprises a locking pin to be arranged in the passage locking two assembled probe sections by limiting movement of the abutment portion in a longitudinal direction.

16 Claims, 4 Drawing Sheets

(56) References Cited

U.S. PATENT DOCUMENTS

| | | | |
|---|---|---|---|
| 4,802,695 A * | 2/1989 | Weinhold | F16L 19/0206 285/148.19 |
| 5,936,589 A | 8/1999 | Kawahata | |
| 7,012,437 B2 | 3/2006 | Klofer | |
| 7,237,435 B2 * | 7/2007 | Motzer | B08B 1/008 73/290 R |
| 7,592,946 B2 | 9/2009 | Klees et al. | |
| 2004/0025588 A1 * | 2/2004 | Schroth | G01F 23/284 73/304 C |
| 2006/0090562 A1 * | 5/2006 | Motzer | B08B 1/008 73/290 R |
| 2006/0225499 A1 | 10/2006 | Gravel et al. | |
| 2007/0034002 A1 * | 2/2007 | Reimelt | G01F 23/284 73/290 R |
| 2007/0205781 A1 * | 9/2007 | Eriksson | G01F 23/284 342/124 |
| 2008/0256866 A1 * | 10/2008 | DePietro | B65D 90/10 49/236 |
| 2013/0061669 A1 * | 3/2013 | Bogdanchik | G01F 23/26 73/304 C |

FOREIGN PATENT DOCUMENTS

| | | |
|---|---|---|
| EP | 1 541 976 | 6/2005 |
| GB | 21006 | 0/1914 |
| GB | 2 047 369 | 11/1980 |

* cited by examiner

SECTIONED PROBE FOR A RADAR LEVEL GAUGE

FIELD OF THE INVENTION

The present invention relates to a level gauge system using electromagnetic waves for determining the distance to a surface of a product contained in a tank.

TECHNICAL BACKGROUND

Microwave level gauge, or radar level gauge (RLG), systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a guided wave transmission line.

In a GWR-system, a probe is generally arranged to extend vertically from the top of the tank towards the bottom of the tank. Probes for GWR level gauge systems are typically provided in the form of wire probes or rigid probes. A wire probe may comprise a metallic wire having a diameter between a few mm up to tens of millimeters. Rigid probes often have a larger diameter.

In level gauge system used in large tanks, such as tanks for liquid natural gas (LNG) which may be around 30 m high, wire probes are often used due to the ease of installation. Installation of a wire probe may comprise attaching a weight to the bottom of the probe and simply lowering the probe into the tank.

However, for certain applications it may be desirable, or even necessary, to use a rigid probe. A rigid probe is typically more robust and thereby more resilient to both mechanical wear and tear as well as to chemical exposure. As is readily realized, a conventional rigid probe for use in large tanks formed in one piece can be difficult to both transport and install.

Furthermore, the varying size of tanks for different applications means that a level gauge system must be provided with a probe where the length is either tailor made for the specific tank, where the length may be adjusted during installation.

To overcome the problems associated with using rigid probes in large tanks, U.S. Pat. No. 7,012,437 discloses a fill level measuring device where the signals are guided along a surface waveguide, and where the surface waveguide comprises a plurality of segments which are arranged to telescope into, and out of, each other. Thereby, a probe having an adjustable length is provided.

However, as the probe disclosed by U.S. Pat. No. 7,012,437 comprises telescoping segments, there is a change in diameter of the probe at each transition from one segment to the next. Such diameter transitions may disturb the signal being guided along the probe and introduce spurious eco signals on the probe.

Furthermore the length of the probe is controlled by a regulator control unit, thereby adding components and complexity of the system, which in turn increase the overall cost of the measuring device.

SUMMARY OF THE INVENTION

In view of the above-mentioned, a general object of the present invention is to provide an improved probe for a guided wave radar level gauge system, a level gauge system comprising such a probe, and a method for arranging such a probe in a guided wave radar level gauge system.

According to a first aspect of the present invention, it is therefore provided a guided wave radar level gauge for determining a filling level of a product contained in a tank, which level gauge comprises: a transceiver for transmitting electromagnetic transmission signals and receiving reflected electromagnetic signals reflected at a surface of the product; processing circuitry connected to the transceiver and configured to determine the filling level based on the received reflected electromagnetic signals; a single conductor probe configured to guide the electromagnetic transmission signals towards the surface and to guide the reflected electromagnetic signals back to the transceiver, the probe comprising at least two elongate probe sections, each probe section being electrically conductive and having a circular cross section; wherein a connector permanently attached to and extending from a first end portion of the probe section comprises: an abutment portion having a diameter smaller than a diameter of the probe section; an intermediate portion, arranged between the probe section and the abutment portion, the intermediate portion having a diameter smaller than the abutment portion; and an outside threaded portion; wherein a second end portion of the probe section comprises: a sleeve permanently attached to the probe section and comprising a receiving portion being inside threaded and configured to receive the outside threaded portion of the connector; a passage through a sidewall of the sleeve, the passage being located off-center in relation to a longitudinal central axis of the probe section, such that the passage is located radially outside of the intermediate portion and radially inside of the abutment portion when a connector of a first probe section is fitted in a sleeve of a second probe section; and wherein the probe further comprises a locking pin configured to be arranged in the passage such that the first probe section is locked to the second probe section by limiting movement of the abutment portion in a longitudinal direction.

The tank may be any container or vessel capable of containing a product, and may be metallic, or partly or completely non-metallic, open, semi-open, or closed.

That the passage arranged through the sidewall of the sleeve is located off-center and radially outside of the intermediate portion of the connector has the effect that there is no need for a corresponding passage in the connector. The passage should be understood as a passage through a sidewall of the sleeve in the form of an opening in the sidewall. Thus, the locking pin may be arranged in the passage without interfering with the intermediate portion of the connector. Thereby, it is not required to consider the rotational alignment of the connector when connecting the probe sections. Furthermore, as an opening in the sleeve is located so that the passage is arranged radially inside of the radial extension of the abutment portion of the connector, the locking pin prevents disconnection of the probe sections by preventing the abutment from moving out of the sleeve.

The present invention is based on the realization that a rigid probe for level gauge may advantageously comprise separate individual probe sections which may be connected and secured to each other through the use of a threaded connection and a locking pin arranged in a passage through a sidewall of one of the probe section, for preventing the probe sections from being disconnected from each other. A threaded connection between the two probe sections provides both mechanical stability as well as protection against accidental disconnection of the probes. However, if using only a threaded connection without the locking pin, vibrations in the probe may cause the connection to be unscrewed. Such vibrations may for example be the result of movement of a product in a tank in which the probe is located. Thus, the locking pin acts to ensure that the probe sections are prevented from accidentally disconnecting.

Through the use of a probe made up of separate probe sections, both transportation and installation of the probe is simplified. The use of a modular probe comprising separate probe sections facilitates installation of a probe for example in an arrangement where the installation takes place in a cramped space.

In addition to the ease of installation, it is also easy to adjust the total length of the probe by selecting the number of probe sections used. Furthermore, this enables the use of the same type of probe for various different applications and in tanks or containers of different size, which reduces the number of different probe types which must be made available by a manufacturer.

Furthermore, a locking pin can be made sufficiently small, or from a suitable material, such that any echo signal resulting from reflection, from the locking pin, of an electromagnetic signal propagating along the probe does not disturb the level measurement.

Also, a probe made up of different sections connected by means of a locking pin is also easy to disassemble, so that the probe for example may be reused in different applications.

In one embodiment of the invention, the outside threaded portion may advantageously be arranged between said intermediate portion and said probe section.

According to one embodiment of the invention, the passage may advantageously extend through two sidewalls of the sleeve. The passage may extend through one or two sidewalls of the sleeve. Whether one or two passages are used may for example be determined by the type of locking pin to be used. Providing the passage through two sidewalls of the sleeve facilitates the use of various types of locking pins as will be discussed in further detail in the following.

In various embodiments of the invention the locking pin may advantageously be a split pin arranged through said passage. A split pin is a pin comprising two tines which are bent when installing the pin such that the pin is secured in the passage. A split pin is advantageously used as it is uncomplicated, easy to install and remove and can be made at a low cost.

In various embodiments of the invention the locking pin may advantageously be tapered to engage with the sleeve when inserted into the passage. A tapered pin, i.e. a pin which is slightly conical, can be inserted into the passage and secured to the sleeve by simply inserting the pin into the passage by applying a certain force on the pin. For a tapered pin, a passage having openings in two sidewalls may be used to simplify removal of the tapered pin.

In various embodiments of the invention, the passage through the sidewall may advantageously be inside threaded, and the locking pin may then be outside treaded and configured to be screwed into the passage. A threaded pin, or a screw, can be screwed into corresponding inside threads of openings passing one or both of the sidewalls of the sleeve.

According to one embodiment of the invention, the abutment portion may advantageously comprise outside threads configured to be threaded into the inside threads of said receiving portion. By providing also the abutment portion with threads, further mechanical stability of the connection can be achieved. Moreover, various geometrical configurations of the connector is possible when using a threaded abutment portions, such as for example variations in length of the abutment portion and the threaded portion of the connector.

In one embodiment of the invention, the probe section may advantageously be substantially solid. A substantially solid probe provides advantageous electrical properties for acting as a single conductor electromagnetic waveguide. Furthermore, a solid probe is mechanically stable and relatively insensitive to mechanical wear and tear.

According to one embodiment of the invention, the connector and the first probe section may advantageously be made in one piece from a metallic cylinder. A probe section as described above may for example be manufactured by machining a metallic elongate cylinder, which provides a simple manufacturing process where no attachment of separate elements is required.

Further more, the sleeve may also be made in the same manner. Thereby, the entire probe section may be manufactured from a single piece of material, and in one process.

According to one embodiment of the invention, the probe section may be substantially tubular. In some application it may be desirable to use tubular probe section. Such an application may for example be in cases where it is desirable to reduce the weight of the probe.

In one embodiment of the invention, the level gauge may further comprise a transceiver connector for connecting the probe to said transceiver. In some applications, it may be possible to connect the connector or the sleeve of the probe section directly to the transceiver or to the transceiver via a tank feedthrough. However, for example if the interface of the transceiver does not correspond to the connector or sleeve of the probe section, it may be necessary to use a transceiver connector in the form of an adapter arranged between the probe and the transceiver. The transceiver connector may for example be a part of a tank feedthrough.

In various embodiments of the invention, the probe section may further comprise a tool engagement portion arranged adjacent to at least one of said first end portion and said second end portion of said probe section. In order to ensure that the threaded connection is sufficiently tightened, it may be required to use a tool for the assembly of probe section. To facilitate the use of a tool, tool engagement portions may be arranged at the end portions of the probe sections, adjacent to but not interfering with the connector and the sleeve. The tool engagement portions may for example be flat portions of the probe which allows the engagement of a wrench, such as a fixed wrench.

According to a second aspect of the invention, there is provided a probe section for a guided wave radar level gauge, the probe section being electrically conductive, elongate and having a circular cross section and a substantially uniform diameter; a first end portion of the probe section comprising: an abutment portion having a diameter smaller than a diameter of the probe section; an intermediate portion, arranged between the probe section and the abutment portion, the intermediate portion having a diameter smaller than the abutment portion; and an outside threaded portion; wherein an second end portion of the probe section comprises: a sleeve permanently attached to the probe section and comprising a receiving portion being inside threaded and configured to receive the outside threaded portion of the connector; and a passage through a sidewall of the sleeve, the passage being located off-center in relation to a longitudinal central axis of the probe, such that the passage is located radially outside of the intermediate portion and radially inside of the abutment portion when the connector is fitted in the sleeve.

There is also provided a modular probe for a guided wave radar level gauge comprising a plurality of probe sections according to the second aspect of eh invention, wherein a first end portion of a first probe section is connected to a second end portion of a second probe section to form a modular probe.

Furthermore, the modular probe described above may advantageously be used as a single conductor probe in a guided wave radar level gauge Further effects and features of this second aspect of the present invention are largely analogous to those described above in connection with the first aspect of the invention.

According to a third aspect of the invention, there is provided a method for arranging a guided wave radar level gauge in a tank, which level gauge system comprises: a transceiver for transmitting electromagnetic transmission signals and receiving reflected electromagnetic signals reflected at a surface of the product; processing circuitry connected to the transceiver and configured to determine the filling level based on the received reflected electromagnetic signals; a single conductor probe configured to guide the electromagnetic transmission signals towards the surface and to guide the reflected electromagnetic signals back to the transceiver, the probe comprising at least two elongate probe sections, each probe section being electrically conductive and having a circular cross section; wherein a connector permanently attached to and extending from a first end portion of each probe section comprises: an abutment portion having a diameter smaller than a diameter of the probe section; an intermediate portion, arranged between the probe section and the abutment portion, the intermediate portion having a diameter smaller than the abutment portion; and an outside threaded portion; wherein a second end portion of the probe section comprises: a sleeve permanently attached to the probe section and comprising a receiving portion being inside threaded and configured to receive the outside threaded portion of the connector; and a passage through a sidewall of the sleeve, the passage being located off-center in relation to a longitudinal central axis of the probe section, such that the passage is located radially outside of the intermediate portion and radially inside of the abutment portion when a connector of a first probe section is fitted in a sleeve of a second probe section; the method comprising; assembling the probe by screwing a connector of a first probe section into a sleeve of a second probe section; inserting a locking pin into the passage of the sleeve such that the locking pin prevents the abutment portion from moving in a longitudinal direction of the probe, thereby preventing the first and second probe sections from being disassembled; securing the locking pin to the sleeve; mechanically connecting the tank feedthrough connector of the first probe section to a tank feedthrough such that the probe extends into the tank; arranging the transceiver and the processing circuitry in connection with the tank feedthrough; and electrically connecting the transceiver to the probe.

The above described method for arranging a guided wave radar level gauge in a tank may easily be performed by an operator when installing the level gauge in a tank.

In one embodiment of the invention, inserting the locking pin may advantageously comprise inserting a split pin into the passage and through the sleeve, and bending at least one tine of the split pin such that the split pin is prevented from leaving the passage.

Furthermore, in one embodiment of the invention, inserting the locking pin may advantageously comprise screwing the locking pin into an inside threaded passage of said sleeve.

Further effects and features of this third aspect of the present invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the invention, wherein.

DETAILED DESCRIPTION EXAMPLE EMBODIMENTS OF THE INVENTION

In the present detailed description, various embodiments of a system and a method according to the present invention are mainly discussed with reference to a radar level gauge system using a probe comprising a plurality of probe sections.

Figure 1:
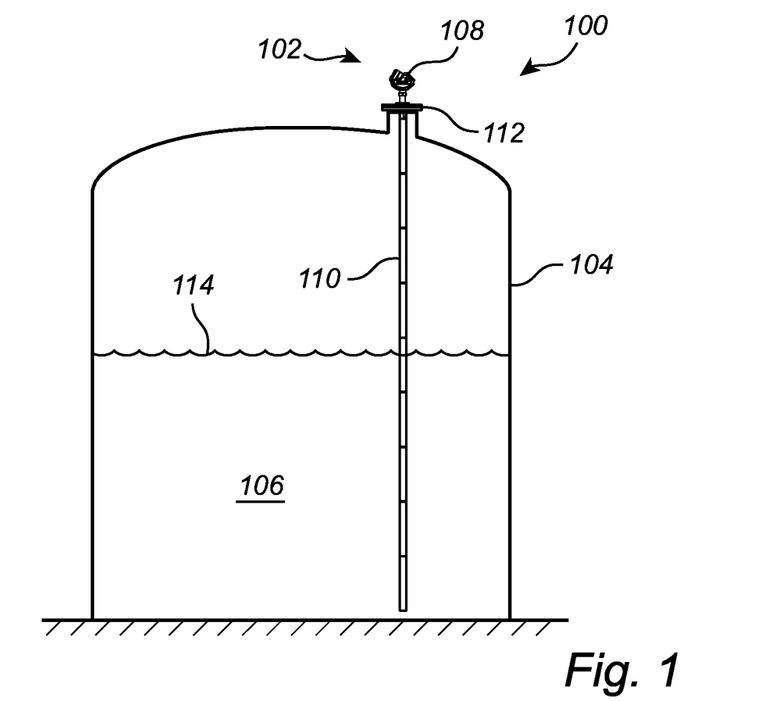
FIG. 1 schematically illustrates a level gauge system according to an embodiment of the invention.

FIG. 1 is a schematic illustration of a guided wave radar level gauge system 100 comprising a level gauge 102 arranged in a tank 104 filled with a product 106 to be measured. A measurement unit 108 is arranged on the ceiling of the tank 104 and connected to the probe 110 via a tank throughput 112. The measurement unit 108 comprises a transceiver and processing circuitry (not shown) for generating transmitting and receiving electromagnetic signals and for determining a filing level based on received reflected signals. In general, the filling level can be determined by transmitting an electromagnetic signal which propagates along the probe 110 and is at least partially reflected at the surface 114 of the product.

Figure 2A:
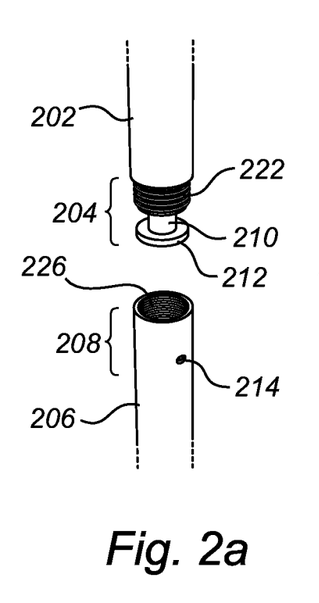
FIGS. 2*a-b* are schematic illustrations of connectors for a probe of a radar level gauge system according to an embodiment of the invention.
Figure 2B:
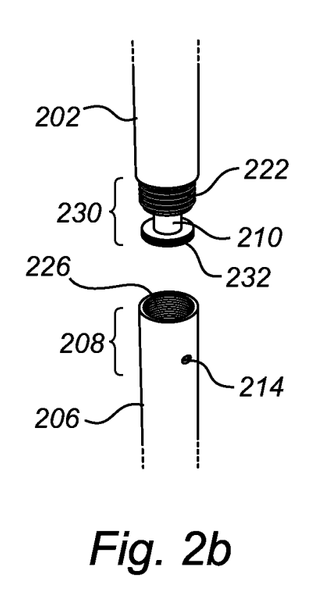

FIGS. 2*a* and 2*b* illustrate various embodiments of a connector and a corresponding receiving sleeve for connecting two probe sections of a probe in a level gauge.

In FIG. 2*a*, a first probe section 202 is shown comprising a connector 204 extending from an end portion of the first probe section 202, and a second probe section 206 comprising a sleeve 208 configured to receive the connector 204. The connector 204 comprises an outside threaded portion 220 and the sleeve 224 comprises corresponding inside threads 226. The connector further comprises an intermediate portion 210 extending from the end probe 202, the intermediate portion 210 having a diameter which is smaller than the diameter of the probe 202, and an abutment portion 212 having a diameter which is larger than the diameter of the intermediate portion 210 arranged at the end of the connector 204 adjacent to the intermediate portion 210. Furthermore, an opening is arranged in the sleeve 208 to form a passage 214 through at least one sidewall of the sleeve 208.

By connecting threaded portions 222 and 226, the two probe sections are mechanically stabilized in relation to each other.

FIG. 2b schematically illustrates a connector where also the abutment portion 232 is outside threaded so as to engage with the inside threads 226 of the sleeve 208. Thereby, additional stability can be provided. It should be noted that variations of the embodiments illustrated in FIGS. 2a and 2b are possible. For example, the length of the outside threaded portion 222 and of the abutment portion 212, 232 may vary.

The connector 204, 230 and the probe section 202 may be made from one and the same piece of material for example by machining the end portion of an elongate cylinder. The cylinder is preferably made from a material suitable for guiding electromagnetic waves, such as for example stainless steel or other metal alloys. It may be desirable to provide the probe in a material which is resistant to corrosion, such as stainless steel. However, it is also possible to manufacture the connector and the probe section separately and to thereafter permanently attach the two pieces together, for example by welding. The same principles applies for the sleeve 208 and the second probe section, which may also be made from one part, or as separate parts to be permanently attached to each other.

Furthermore, the probe section 202, 206 preferable has a substantially uniform diameter. The diameter of a probe section may be in the range of 10 to 20 mm, such as for example 13 mm, approximately equal to 0.5 inches. By using a probe having a uniform diameter, the probe can provide uniform propagation properties over the length of the probe which is desirable for accurate filling level determination as, a varying diameter, and in particular a stepwise varying diameter, may result in spurious echo signals.

FIGS. 3a to 3d schematically illustrate various locking pins for connecting two probe sections of a probe in a level gauge.

Figure 3A:
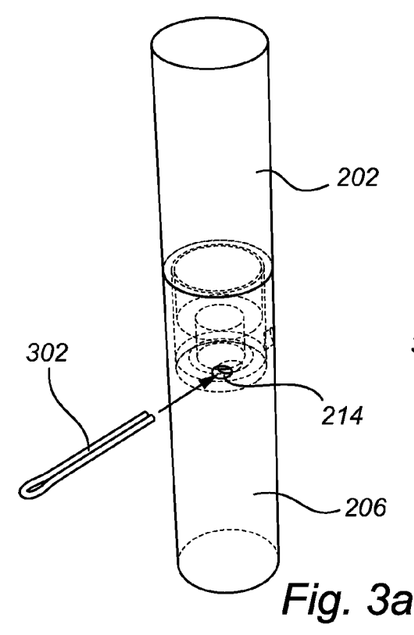
FIGS. 3*a-d* are schematic illustrations of locking pins for a probe in a radar level gauge system according to an embodiment of the invention.

FIG. 3a illustrates a split pin 302 which after insertion through the passage 214 is bent so that it is prevented from accidentally being removed from the passage 214. The split pin, as well as other types of locking pins, is preferably formed from a material which is resistant to corrosion, such as stainless steel, or other alloys or metals having similar properties. The passage 214 is located off-center in relation to a longitudinal axis of the probe so that the locking pin may pass unhindered through the sleeve. Once the locking pin has been inserted, the abutment portion 212 of the connector 204, 216, 220, 228 will not be able to move out of the sleeve as movement is blocked by the locking pin.

Figure 3B:
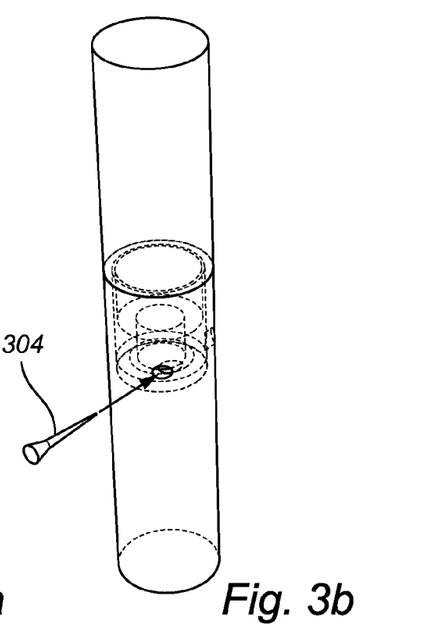
Figures 3C, 3D:
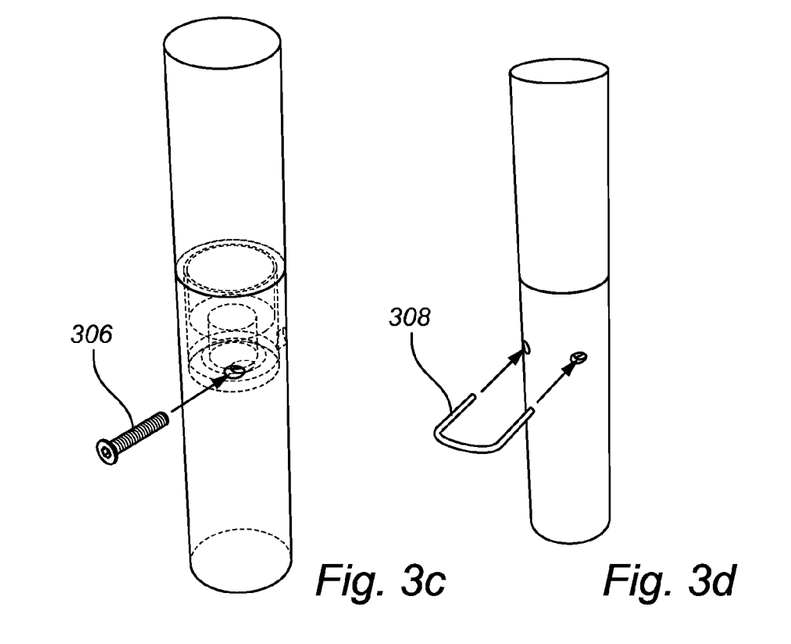

In FIG. 3b, a tapered locking pin 304 is illustrated, FIG. 3c shows a threaded locking pin 306m, i.e. a screw, and FIG. 3d shows a u-shaped locking pin 308 the ends of which pin can be bent to secure the locking pin 308 to the sleeve.

It should be noted that each of the locking pins illustrated in FIGS. 3a-d may be used together with any of the connector-sleeve combinations illustrated in FIGS. 2a-b. Furthermore, the person skilled in the readily realize that variations based on the illustrated examples may equally well be used.

Figure 4:
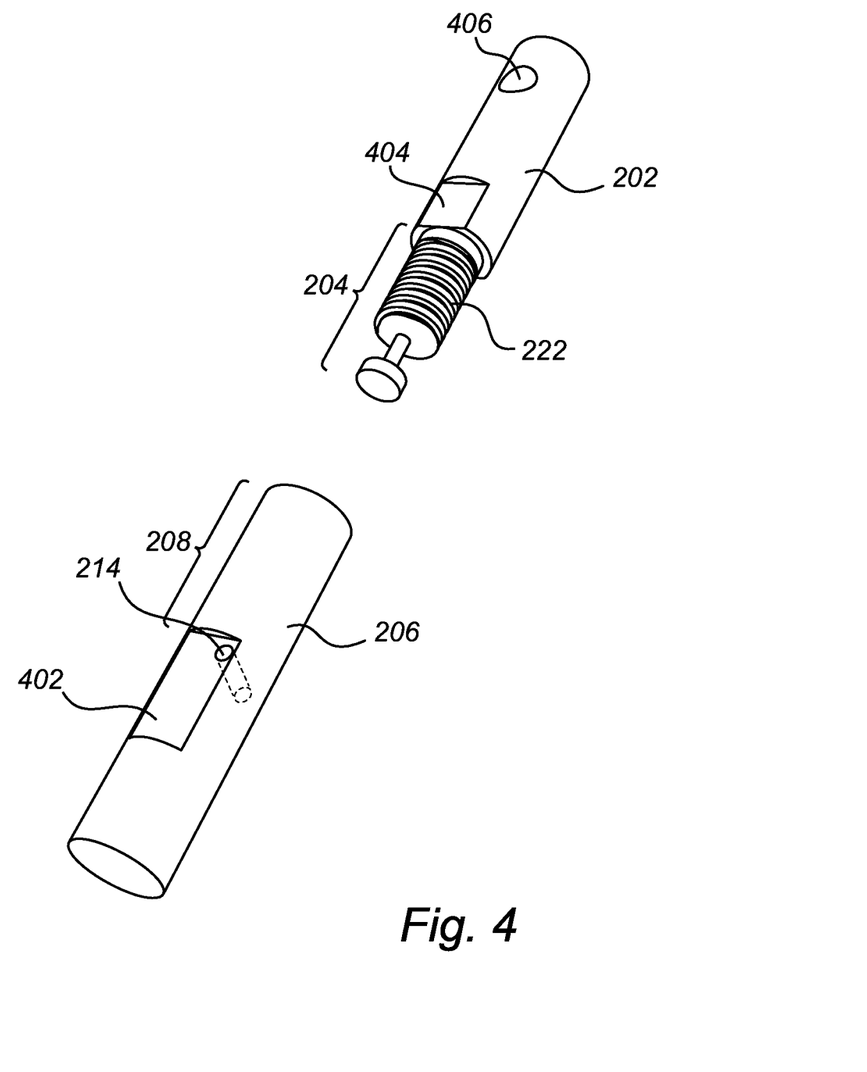
FIG. 4 schematically illustrates a probe section according to an embodiment of the invention.

FIG. 4 schematically illustrates probe sections 202, 206 comprising tool engagement portions 402, 404, 406. The tool engagement portion may for example be a flat portion 402, 404 of the probe which allows engaging the probe with a wrench. The tool engagement portion may also be a hole 406 through the probe, where it is possible to insert a tool acting as a lever to achieve an increased torque when assembling the probe sections.

Figure 5A:
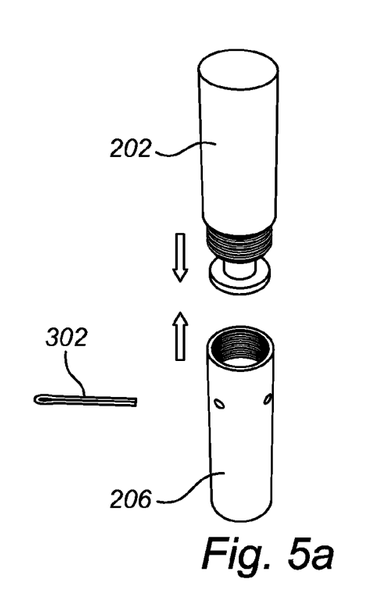
FIGS. 5*a-e* schematically illustrates a method for arranging a probe in a tank according to an embodiment of the invention.
Figures 5B, 5C:
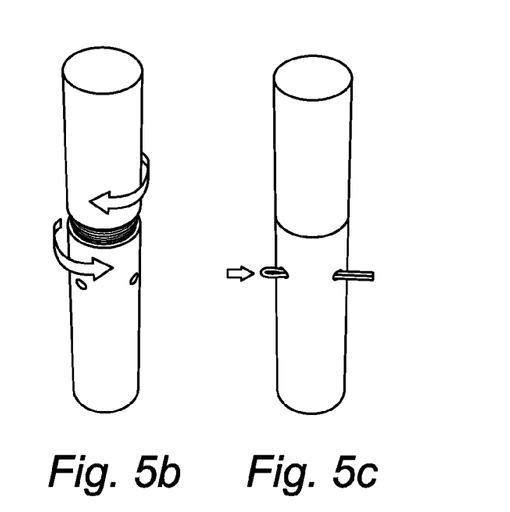
Figure 5D:
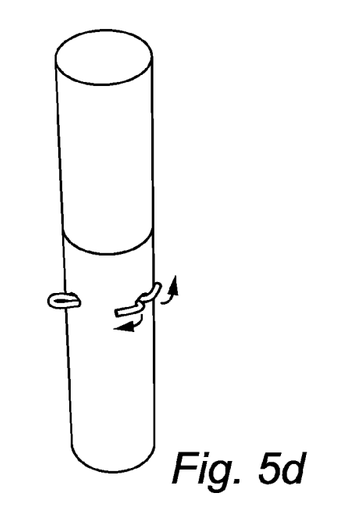
Figure 5E:
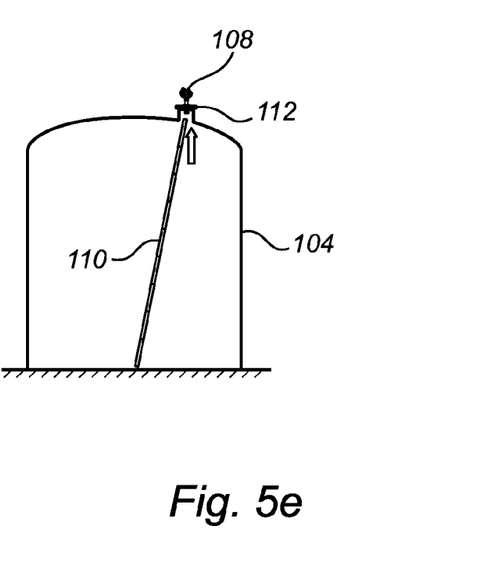

FIGS. 5a-e schematically illustrates a method for arranging a guided wave radar level gauge in a tank. In the first step illustrated in FIG. 5a, the connector 216 of the first probe section 202 is inserted into the receiving sleeve 208 of the second probe section 206. As illustrated in FIG. 5b, the two probe sections are then screwed together such that the outside threaded portion 222 of the connector 204 engages with the inside threaded portion 226 of the sleeve 208. The connection may be performed manually by an operator, either by hand or with the use of a tool if required. Next, in FIG. 5c, a locking pin, here illustrated in the form of a split pin 302 is inserted into the passage 214 and through the sleeve 208. In FIG. 5d it is illustrated how the legs of the split pin are bent so that the pin is prevented from accidentally being removed from the passage. Finally, in FIG. 5e, the probe 110 is arranged in the tank 104 and electrically connected to the transceiver. When the probe is to be used in a closed tank, electrical and mechanical connection may be achieved using a tank feedthrough 112 structure.

Even though the invention has been described with reference to specific exemplifying embodiments thereof, many different alterations, modifications and the like will become apparent for those skilled in the art. For example, the precise geometry of the connector may vary, while still being able to provide sufficient mechanical stability and allowing the use of a locking pin for additional safety. Also, it should be noted that parts of the system may be omitted, interchanged or arranged in various ways, the level gauge yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A guided wave radar level gauge for determining a filling level of a product contained in a tank, which level gauge comprises:
    a transceiver for transmitting electromagnetic transmission signals and receiving reflected electromagnetic signals reflected at a surface of said product;
    processing circuitry connected to said transceiver and configured to determine said filling level based on said received reflected electromagnetic signals;
    a single conductor probe configured to guide said electromagnetic transmission signals towards said surface and to guide said reflected electromagnetic signals back to said transceiver, said probe comprising at least two elongate probe sections, each probe section being electrically conductive and having a circular cross section;
    wherein a connector permanently attached to and extending from a first end portion of each probe section comprises:
        an abutment portion having a diameter smaller than a diameter of said probe section;
        an intermediate portion, arranged between said probe section and said abutment portion, said intermediate portion having a diameter smaller than said abutment portion; and
        an outside threaded portion;
    wherein a second end portion of said probe section comprises:

a sleeve permanently attached to said probe section and comprising a receiving portion being inside threaded and configured to receive said outside threaded portion of said connector;

a passage through a sidewall of said sleeve, said passage being located off-center in relation to a longitudinal central axis of said probe section, such that said passage is located radially outside of said intermediate portion and radially inside of said abutment portion when a connector of a first probe section is fitted in a sleeve of a second probe section; and wherein said probe further comprises a locking pin configured to be arranged in said passage such that said first probe section is locked to said second probe section by limiting movement of said abutment portion in a longitudinal direction;

wherein each probe section has a diameter not greater than 20 mm, wherein the first end portion of the first probe section abuts the sleeve of the second probe section when the probe is assembled, and wherein the single conductor probe is straight.

2. The level gauge according to claim 1, wherein said outside threaded portion is arranged between said intermediate portion and said probe section.

3. The level gauge according to claim 1, wherein said passage extends through two sidewalls of said sleeve.

4. The level gauge according to claim 3, wherein said locking pin is a split pin.

5. The level gauge according to claim 1, wherein said locking pin is tapered to engage with said sleeve when inserted into said passage.

6. The level gauge according to claim 1, wherein said passage through said sidewall is inside threaded, and said locking pin is outside treaded and configured to be screwed into said passage.

7. The level gauge according to claim 1, wherein said abutment portion comprises outside threads configured to be threaded into inside threads of said receiving portion.

8. The level gauge according to claim 1, wherein said probe section is substantially solid.

9. The level gauge according to claim 1, wherein said connector and said probe section are made in one piece from a metallic cylinder.

10. The level gauge according to claim 1, wherein said sleeve and said probe section are made in one piece from a metallic cylinder.

11. The level gauge according to claim 1, wherein said probe section is substantially tubular.

12. The level gauge according to claim 1, further comprising a transceiver connector for connecting said probe to said transceiver.

13. The level gauge according to claim 1, wherein said probe section further comprises a tool engagement portion arranged adjacent to at least one of said first end portion and said second end portion of said probe section.

14. Method for arranging a guided wave radar level gauge in a tank, which level gauge system comprises:

a transceiver for transmitting electromagnetic transmission signals and receiving reflected electromagnetic signals reflected at a surface of said product;

processing circuitry connected to said transceiver and configured to determine said filling level based on said received reflected electromagnetic signals;

a single conductor probe configured to guide said electromagnetic transmission signals towards said surface and to guide said reflected electromagnetic signals back to said transceiver, said probe comprising at least two elongate probe sections, each probe section being electrically conductive and having a circular cross section;

wherein a connector permanently attached to and extending from a first end portion of each probe section comprises:

an abutment portion having a diameter smaller than a diameter of said probe section;

an intermediate portion, arranged between said probe section and said abutment portion, said intermediate portion having a diameter smaller than said abutment portion; and an outside threaded portion;

wherein a second end portion of said probe section comprises:

a sleeve permanently attached to said probe section and comprising a receiving portion being inside threaded and configured to receive said outside threaded portion of said connector; and a passage through a sidewall of said sleeve, said passage being located off-center in relation to a longitudinal central axis of said probe section, such that said passage is located radially outside of said intermediate portion and radially inside of said abutment portion when a connector of a first probe section is fitted in a sleeve of a second probe section;

said method comprising;

assembling said probe by screwing a connector of a first probe section into a sleeve of a second probe section such that the first end portion of the first probe section abuts the sleeve of the second probe section, wherein the assembled probe is straight;

inserting a locking pin into said passage of said sleeve such that said locking pin prevents said abutment portion from moving in a longitudinal direction of said probe, thereby preventing said first and second probe sections from being disassembled;

securing said locking pin to said sleeve;

arranging said straight probe vertically in the tank;

mechanically connecting said tank feedthrough connector of said first probe section to a tank feedthrough such that said probe extends into said tank;

arranging said transceiver and said processing circuitry in connection with said tank feedthrough; and electrically connecting said transceiver to said probe.

15. The method according to claim 14 wherein inserting said locking pin comprises inserting a split pin into said passage and through said sleeve, and bending at least one tine of said split pin such that said split pin is prevented from leaving said passage.

16. The method according to claim 14, wherein inserting said locking pin comprises screwing said locking pin into said passage of said sleeve.

* * * * *